United States Patent
Kim et al.

(10) Patent No.: US 10,756,322 B2
(45) Date of Patent: Aug. 25, 2020

(54) COMPOSITE SEPARATOR FOR SECONDARY BATTERY AND LITHIUM SECONDARY BATTERY INCLUDING THE SAME

(71) Applicant: SK INNOVATION CO., LTD., Seoul (KR)

(72) Inventors: Yun Bong Kim, Daejeon (KR); Won Sub Kwack, Daejeon (KR); Hye Jin Kim, Daejeon (KR); Su Ji Lee, Daejeon (KR); Kyu Young Cho, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 16/203,258

(22) Filed: Nov. 28, 2018

(65) Prior Publication Data
US 2019/0165349 A1    May 30, 2019

(30) Foreign Application Priority Data
Nov. 29, 2017  (KR) .......................... 10-2017-0161609

(51) Int. Cl.
| | | |
|---|---|---|
| *H01M 2/16* | (2006.01) | |
| *H01M 10/052* | (2010.01) | |
| *H01M 4/62* | (2006.01) | |
| *H01M 2/14* | (2006.01) | |

(52) U.S. Cl.
CPC ............. *H01M 2/16* (2013.01); *H01M 2/145* (2013.01); *H01M 2/1653* (2013.01); *H01M 4/622* (2013.01); *H01M 10/052* (2013.01)

(58) Field of Classification Search
CPC ...... H01M 2/16; H01M 2/145; H01M 2/1653; H01M 4/622; H01M 10/052
See application file for complete search history.

(56) References Cited

U.S. PATENT DOCUMENTS

| | | | | |
|---|---|---|---|---|
| 2013/0273421 | A1* | 10/2013 | Matsumura | H01M 10/052 429/211 |
| 2014/0141314 | A1* | 5/2014 | Kaneda | H01M 2/166 429/144 |
| 2014/0186680 | A1* | 7/2014 | Kim | H01M 2/1646 429/144 |
| 2014/0272532 | A1† | 9/2014 | Park | |
| 2014/0308565 | A1* | 10/2014 | Lee | H01M 2/1686 429/144 |
| 2016/0172678 | A1* | 6/2016 | Oyama | H01G 11/38 429/217 |

FOREIGN PATENT DOCUMENTS

KR    1020160041492    4/2016

* cited by examiner
† cited by third party

*Primary Examiner* — Kenneth J Douyette
(74) *Attorney, Agent, or Firm* — IP & T Group LLP

(57) ABSTRACT

Provided are a composite separator for a secondary battery including: a porous substrate; and a coating layer, formed on the porous substrate, by thermally curing aqueous slurry including inorganic particles, first binder particles, a second binder, and a thermal curing agent, wherein the first binder particles contain a copolymer of a monomer mixture including an acrylamide-based monomer, a vinyl cyanide-based monomer, an acrylic monomer having a carboxyl group, and an acrylic monomer having a hydroxyl group, and a lithium secondary battery including the same.

6 Claims, No Drawings

COMPOSITE SEPARATOR FOR SECONDARY BATTERY AND LITHIUM SECONDARY BATTERY INCLUDING THE SAME

CROSS-REFERENCE TO RELATED APPLICATION

This application claims priority under 35 U.S.C. § 119 to Korean Patent Application No. 10-2017-0161609, filed on Nov. 29, 2017, in the Korean Intellectual Property Office, the disclosure of which is incorporated herein by reference in its entirety.

TECHNICAL FIELD

The following disclosure relates to a composite separator for a secondary battery, and a lithium secondary battery including the same.

BACKGROUND

In recent years, according to high capacity and high output trends of a secondary battery, there is a growing demand for high strength, high permeability and thermal stability of a separator, and improved properties of a separator for electrical safety of a secondary battery during charging and discharging. The lithium secondary battery is required to have high mechanical strength for improving safety in a battery manufacture process and during use of the battery, and to have high permeability and high thermal stability for improving a capacity and output.

For securing safety and improving the lithium secondary battery, among various constituents included in the lithium secondary battery, physical and electrochemical safety of the separator is particularly important. For example, when thermal stability of the separator is lowered, an inter-electrode short circuit due to damage or deformation of the separator caused by a temperature rise in the battery may occur, thereby increasing a risk of overheating or fire of the battery. In addition, as an application scope of the lithium secondary battery is extended to a hybrid vehicle, and the like, securing safety of the secondary battery following overcharge has become an important requirement, and a property of the separator which may withstand electrical pressure following overcharge is required.

Thermal stability of the secondary battery is influenced by a closing temperature, a melt fracture temperature, thermal shrinkage, or the like of the separator. Among them, thermal shrinkage at a high temperature has a great influence on the thermal stability of the battery. In the case that the thermal shrinkage is high, when the inside of the battery reaches high temperature, an edge portion of an electrode is exposed during shrinkage to cause the inter-electrode short circuit, which leads to heat/ignition/explosion, or the like. In addition, even in the case that a melt fracture temperature of the separator is high, but the thermal shrinkage is how, an edge portion of the battery is exposed while the electrode is heated, thereby causing the inter-electrode short circuit.

In order to overcome the safety problem of an electrochemical device as described above, as a porous polymer substrate of a generally used separator, polyolefin-based polymer films such as polyethylene (PE) and polypropylene (PP) films are widely used, which are advantageous for pore formation and has excellent chemical resistance, mechanical physical properties and thermal properties. However, polyolefin has severe thermal shrinkage at a nigh temperature, and is physically vulnerable. Usually, a method of forming a polyolefin-based microporous film, and then laminating an inorganic layer on the surface thereof is adopted, as a method of raising thermal resistance of a polyolefin film. However, during forming the polyolefin-based microporous film, heat setting is performed, and in this process, the film is partially melted, so that the surface pores of the porous film are closed and damaged, thereby greatly increasing a ventilation time.

In addition, since a conventional separator including an inorganic layer uses an organic solvent in the manufacturing process, there are some problems in a coating method based on a binder composition dissolved in the organic solvent. First, when the organic solvent is volatilized in the drying process, a binder dissolved in the organic solvent forms a gel, thereby generating a solvent-impermeable space, resulting in an unbalanced organic/inorganic coating layer, and this phenomenon may lower battery characteristics. In addition, explosion proof equipment is needed, and byproducts harmful to the environment or a human body occur in the working process. Also, there is a problem in that in the state that the binders are dissolved in the organic solvent, pores of the porous polymer substrate are closed.

In order to solve the problem, Korean Patent Laid-Open Publication No. 10-2016-0041492 suggests a method of using a polyvinylidene fluoride dispersion and aqueous slurry including inorganic particles and organic particles to form a coating layer on a porous polymer substrate. As the separator therefor, a separator for an electrochemical device improving adhesive strength with a porous substrate to have excellent thermal resistance and strength has been suggested, however, a degree of thermal and electrochemical safety of the separator is still insufficient to be used for securing safety of the battery, whereby improvement of a battery capacity is still needed.

A process for manufacturing a novel separator having excellent thermal and electrochemical stability, and being advantageous for securing pores, for solving the problems is demanded.

RELATED ART DOCUMENT

[Patent Document]
(Patent Document 1) Korean Patent Laid-Open Publication No. 10-2016-0041492

SUMMARY

An embodiment of the present invention is directed to providing a composite separator for a secondary battery having significantly improved thermal stability such as low thermal shrinkage and high melt fracture temperature.

In addition, another embodiment of the present invention is directed to providing a composite separator for a secondary battery which may prevent the rapid migration and overload of lithium ions, even in the case that a porous substrate is damaged.

In addition, another embodiment of the present invention is directed to providing a lithium secondary battery including the composite separator for a secondary battery.

In one general aspect, a composite separator for a secondary battery includes: a porous substrate; and a coating layer formed on the porous substrate, by thermally curing aqueous slurry including inorganic particles, first binder particles, a second binder, and a thermal curing agent.

wherein the first binder particles may contain a copolymer of a monomer mixture including an acrylamide-based monomer, a vinyl cyanide-based monomer, an acrylic monomer having a carboxyl group, and an acrylic monomer having a hydroxyl group.

The first binder particles may contain 30 to 50 wt % of the acrylamide-based monomer, 20 to 40 wt % of the vinyl cyanide-based monomer, 5 to 20 wt % of the acrylic monomer having a carboxyl group, and 5 to 20 wt % of the acrylic monomer having a hydroxyl group, based on the total amount of the first binder particles.

The inorganic particles and the first binder particles may have an average particle diameter of 10 nm to 2 μm.

The second binder may be any one or a mixture of two or more selected from the group consisting of cellulose-based and polyvinyl alcohol-based compounds.

The thermal curing agent may be any one or a mixture of two or more selected from the group consisting of compounds including any one or two or more functional groups selected from, an epoxy group and an oxazoline group.

The first binder particles may have a glass transition temperature of 150 to 200° C.

The composite separator for a secondary battery may have thermal shrinkage at 160° C. of 3% or less, and a melt fracture temperature of 400° C. or more.

In another general aspect, a lithium secondary battery includes the composite separator for a secondary battery.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the composite separator for a secondary battery according to the present invention and a lithium secondary battery including the same will be described in more detail by the following exemplary embodiments. However, the following exemplary embodiments are only a reference for describing the present invention in detail, and the present invention is not limited thereto, and may be implemented in various forms.

In addition, unless other-wise defined, all technical terms and scientific terms have the same meanings as those commonly understood by a person skilled in the art to which the present invention pertains. The terms used herein are only for effectively describing a certain exemplary embodiment, and not intended to limit the present invention.

An exemplary embodiment of the present invention relates to a composite separator for a secondary battery having improved thermal stability and electrical properties of the separator for a secondary battery.

As general separator for a secondary battery, a separator obtained by mixing inorganic particles with a nonaqueous or aqueous binder as a coating layer for improving thermal resistance on a porous substrate, has been used. As the nonaqueous binder, an organic solvent and polyvinylidene fluoride, or the like which is a fluorine-based polymer are used, thereby causing significantly deteriorated adhesive strength between a porous substrate and a coating layer, as well as an environmental pollution problem. In order to solve the problem, an aqueous binder was suggested, thereby having merits of environmental friendliness from using water, and a higher battery capacity from decreasing an amount of the binder used, however, thermal stability was very low. In addition, the nonaqueous or aqueous binder has a problem of ignition, explosion, or the like following overheating and overload, as organic matters dissolved in an organic solvent, a binder dissolved in water, or the like penetrates pores of a porous substrate to cause pore closure to limit lithium ion migration. In particular, due to low thermal stability, it was difficult to cope with overheating and an overload, thereby having difficulty in functioning as separator.

However, the composite separator for a secondary battery according to an exemplary embodiment of the present invention may prevent an increase of internal resistance and overheating of a battery due to pore closure. In addition, the composite separator may include a thermal curing agent, whereby mechanical physical properties may be improved by a thermal curing reaction of first binder particles and a second binder, resulting in preventing the rapid migration and overload of lithium ions, even in the case that a porous substrate is damaged. In particular, as a coating layer in which inorganic particles, first binder particles, a second binder and a thermal curing agent are included and bonded is formed on a porous substrate, thermal stability may be significantly improved due to low thermal shrinkage, high glass transition temperature and high melt fracture temperature, and ignition or rupture due to an abnormal phenomenon such as a rapid temperature rise in a lithium secondary battery may be prevented.

Hereinafter, the present invention will be described in more detail.

The composite separator for a secondary battery according to an exemplary embodiment of the present invention includes: a porous substrate; and a coating layer, formed on the porous substrate, by thermally curing aqueous slurry including inorganic particles, first binder particles, a second binder, and a thermal curing agent, wherein the first binder particles are prepared from aqueous particles containing a copolymer of a monomer mixture including an acrylamide-based monomer, a vinyl cyanide-based monomer, an acrylic monomer having a carboxyl group and an acrylic monomer having a hydroxyl group.

Therefore, the composite separator for a secondary battery according to an exemplary embodiment of the present invention has properties of low thermal shrinkage, high glass transition temperature, and high melt fracture temperature to have significantly improved thermal stability, thereby preventing ignition or rupture due to an abnormal phenomenon such as rapidly raised temperature in a lithium secondary battery.

The composite separator for a secondary battery according to an exemplary embodiment of the present invention has decreased thermal shrinkage at a high temperature, and significantly improved melt fracture temperature, thereby improving thermal stability. In addition, pore closure of a porous substrate, or the like is prevented to allow easy migration of lithium ions, thereby further improving a discharge capacity of a lithium secondary battery.

In addition, the composite separator including a coating layer according to the present invention may prevent limitation of lithium ion migration due to pore closure by a binder, and stably maintain pores when pressure is applied.

According to an exemplary embodiment of the present invention, the first binder particles contain a copolymer of a monomer mixture including an acrylamide-based monomer, a vinyl cyanide-based monomer, an acrylic monomer having a carboxyl group and an acrylic monomer having a hydroxyl group as a binder, thereby surprisingly, having significantly low thermal shrinkage at 160° C. to have significantly superior thermal stability and effect of improving a lifespan.

According to an exemplary embodiment of the present invention, the first binder particles may contain 30 to 50 wt % of the acrylamide-based monomer, 20 to 40 wt % of the vinyl cyanide-based monomer, 5 to 20 wt % of the acrylic monomer having a carboxyl group, and 5 to 20 wt % of the acrylic monomer having a hydroxyl group, based on the total amount of the first binder particles. Preferably, the first binder particles may contain 40 to 50 wt % of the acrylamide-based monomer, 30 to 40 wt % of the vinyl cyanide-based monomer, 5 to 15 wt % of the acrylic monomer having a carboxyl group, and 5 to 15 wt % of the acrylic monomer having a hydroxyl group. As the first binder particles are included in a coating layer as a copolymer of a monomer mixture in the above range, the composite separator for a secondary battery has low thermal shrinkage at 160° C., thereby significantly improved thermal stability and effect of improving a lifespan, which is thus preferred.

According to an exemplary embodiment of the present invention, the acrylamide-based monomer may be, specifically for example, any one or a mixture of two or more selected from the group consisting of acrylamide, n-methylol acrylamide, n-butoxymethyl acrylamide, methacrylamide, and the like. When the acrylamide-based monomer is prepared into a copolymer with a vinyl cyanide-based monomer, an acrylic monomer having a carboxyl group, and an acrylic monomer having a hydroxyl group, wettability in an electrolyte of a secondary battery may be excellent, and the first binder particles themselves may have porosity to maintain the electrolyte well even in the first binder particles, thereby further improving separator stability with excellent ion conductivity.

The vinyl cyanide-based monomer may be, specifically for example, acrylonitrile, methacrylonitrile, ethacrylonitrile, or a mixture thereof. When the vinyl cyanide-based monomer is prepared into a copolymer with an acrylamide-based monomer, an acrylic monomer having a carboxyl group and an acrylic monomer having a hydroxyl group, adhesion and close adhesion with a porous substrate and inorganic particles are improved, and mechanical properties such as stiffness and bending strength of the separator may be improved.

The acrylic monomer having a carboxyl group may be, specifically for example, an acrylic acid, a methacrylic acid, or a mixture thereof. When the acrylic monomer having a carboxyl group is prepared into a copolymer with an acrylamide-based monomer, a vinyl cyanide-based monomer and an acrylic monomer having a hydroxyl group, the separator may have significantly decreased thermal shrinkage at a high temperature, thereby representing excellent thermal stability and effect of improving a lifespan.

A specific example of the acrylic monomer having a hydroxyl group may include any one or a mixture of two or more selected from the group consisting of 2-hydroxyacrylate, 4-hydroxybutylacrylate, 2-hydroxyethylacrylate, 2-hydroxypropylacrylate, 2-acryloxyethyl-2-hydroxypropylphthalate, 2-hydroxy3-phenoxypropylacrylate, and the like. When the acrylic monomer having a hydroxyl group is prepared into a copolymer with an acrylamide-based monomer, a vinyl cyanide-based monomer and an acrylic monomer having a carboxyl group, the separator may have significantly decreased thermal shrinkage at a high temperature, thereby representing excellent thermal stability and effect of improving a lifespan.

According to an exemplary embodiment of the present invention, the composite separator may have very low thermal shrinkage, which is thermal shrinkage at 160° C. of 3% or less, and preferably 1.5% or less. Specifically, the thermal shrinkage at 160° C. may be 0.1 to 3%, and preferably 0.1 to 1.5%. When the separator has the thermal shrinkage, ignition or rupture by an abnormal phenomenon such as a rapid temperature rise in the lithium secondary battery may be prevented.

According to an exemplary embodiment of the present invention, the inorganic particles may be any one or two or more inorganic particles selected from the group consisting of alumina, boehmite, aluminum hydroxide, titanium oxide, barium titanium oxide, magnesium oxide, magnesium hydroxide, silica, clay, glass powder, and the like, but are not limited thereto.

According to an exemplary embodiment of the present invention, the inorganic particles may be contained at 70 wt % or more, preferably at 85 wt % or more, more preferably at 95 wt % or more, specifically at 70 wt % to 99.5 wt %, preferably at 85 wt % to 99.5 wt %, and more preferably at 95 wt % to 99.5 wt %, based on the total amount of 100 wt % of the coating layer, but are not limited thereto.

According to an exemplary embodiment of the present invention, the first binder particles, the second binder, and the thermal curing agent may be contained at 30 wt % or less, preferably 15 wt % or less, more preferably 5 wt % or more, specifically 0.5 wt % to 30 wt %, preferably 0.5 wt % to 15 wt %, and more preferably 0.5 wt % to 5 wt %, based on the total amount of 100 wt % of the coating layer, but are not limited thereto.

According to an exemplary embodiment of the present invention, the inorganic particles and the first binder particles may have an average particle diameter of 10 nm to 2 μm, and preferably 50 to 800 nm. The inorganic particles and the first binder particles may have the same or different average particle diameter from each other.

According to an exemplary embodiment of the present invention, it is preferred that the average particle diameter is different for thermal stability and electrical properties of the composite separator for a secondary battery, and specifically for example, the inorganic particles and the first binder particles may have an average particle diameter ratio satisfying the following Formula 1:

$$0.1 \leq \frac{R_a}{R_i} \leq 0.6 \quad \text{[Formula 1]}$$

wherein $R_a$ is an average particle diameter of the first binder particles; and $R_i$ is an average particle diameter of the inorganic particles.

When the inorganic particles and the first binder particles are included at the average particle diameter ratio, the thermal stability of the composite separator for a secondary battery may be further improved. In addition, the inorganic particles may secure pores generated between inorganic particles, or between inorganic particles and the porous substrate by partial adhesion or bonding by the first binder particles, thereby allowing easy migration of lithium ions to improve a discharge capacity, which is preferred.

According to an exemplary embodiment of the present invention, the second binder is not a particulate, and it is preferred to use an aqueous binder dissolved in aqueous slurry. Preferably, the second binder may be any one or a mixture of two or more selected from the group consisting of cellulose-based compounds, polyvinyl alcohol-based compounds, and the like. Specifically for example, the cellulose-based compound may be any one or two or more selected from the group consisting of carboxymethyl cellulose, hydroxypropyl cellulose, hydroxypropyl methyl cellulose, cellulose acetate, cellulose acetate propionate, and the like, but is not limited thereto. In addition, the polyvinyl alcohol-based compound may be obtained by polymerizing vinyl alcohol as a monomer, but is not limited thereto.

When the second binder is included in the coating layer, the melt fracture temperature may be significantly improved, as compared with the case that only the inorganic particles, the first binder particles and the thermal curing agent are included. Specifically, when the coating layer is formed only with the inorganic particles, the first binder particles and the thermal curing agent, the melt fracture temperature is increased, but increasing the melt fracture temperature to 300° C. or more is not easy, however, when the second binder is included, the melt fracture temperature may be 400° C. or more, whereby the composite separator for a secondary battery having very good thermal stability may be manufactured.

In particular, in the present invention including an aqueous binder as the second binder to be coated as aqueous slurry, the second binder is hardly coated on the surface of the hydrophobic porous substrate, so that the pores of the porous substrate are not damaged. In addition, the second binder is considered to serve as a bridge between the inorganic particles and the first binder particles, and reinforce bond strength to significantly increase thermal resistance and a rise of the melt, fracture temperature.

According to an exemplary embodiment of the present invention, the second binder may be included at 0.1 to 20 parts by weight, and preferably 1 to 10 parts by weight, based on 100 parts by weight of the first binder particles, but is not limited thereto. When the second binder is included within the above range, curing density is improved, whereby the coating layer having excellent strength may be provided, and the melt fracture temperature of the coating layer may be further improved.

According to an exemplary embodiment of the present invention, the thermal curing agent may be any one or a mixture of two or more selected from the group consisting of compounds including any one or two or more functional groups selected from an epoxy group and an oxazoline group. Preferably, the thermal curing agent may be an epoxy group compound or a mixture including an epoxy group compound.

As the thermal curing agent is used, in the present invention, thermal stability is significantly increased, melt fracture temperature is remarkably improved, and though surface uniformity is not digitized separately, as a result of observation with a scanning electron microscope, and the like, it was found that a very uniform surface may be imparted. The reason is not clear, however, it is considered that the thermal curing agent serves as a bridge to induce more firm bonding between particles by chemical bonding or secondary bonding between the first binder particles, or between the first binder particles and the inorganic particles, and the like, by a thermal reaction or other reactions with a reactive group such as the carboxyl group or hydroxyl group of the monomer, thereby showing this phenomenon. In addition, the thermal curing agent may be formed by a reaction of the first binder particles and the polar group of the second binder, and the like, or by the action of various bondings or chemical attraction between the second binder and the inorganic particles, and the like.

As the thermal curing agent, the compound having an epoxy group may be any one or a mixture two or more selected from the group consisting of ethylene glycol diglycidyl ether, triglycidyl ether, trimethylolpropane triglycidyl ether, N,N,N',N'-tetraglycidyl ethylenediamine, glycerine diglycidyl ether, and the like. The compound having an oxazoline group may be any one or two or more selected from the group consisting of 2,2'-methylenebis(2-oxazoline), 2,2'-ethylenebis(2-oxazoline), 2,2'-ethylenebis(4-methyl-2-oxazoline), 2,2'-propylenebis(2-oxazoline), 2,2'-tetramethylenebis(2-oxazoline), 2,2'-hexamethylenebis(2-oxazoline), 2,2'-octamethylenebis(2-oxazoline), 2,2'-p-phenylenebis(2-oxazoline), 2,2'-p-phenylenebis(4,4'-dimethyl-2-oxazoline), 2,2'-p-phenylenebis(4-methyl-2-oxazoline), 2,2'-p-phenylenebis(4-phenyl-2-oxazoline), 2,2'-m-phenylenebis(2-oxazoline), 2,2'-m-phenylenebis(4-methyl-2-oxazoline), 2,2'-m-phenylenebis(4,4'-dimethyl-2-oxazoline), 2,2'-m-phenylenebis(4-phenylenebis-2-oxazoline), 2,2'-o-phenylenebis(2-oxazoline), 2,2'-o-phenylenebis(4-methyl-2-oxazoline), 2,2'-bis(2-oxazoline), 2,2'-bis(4-methyl-2-oxazoline), 2,2'-bis(4-ethyl-2-oxazoline), 2,2'-bis(4-phenyl-2-oxazoline), and the like, but is not limited thereto.

According to an exemplary embodiment of the present invention, the thermal curing agent may be included at a mole ratio of 1:0.01 to 1:2, relative to the acrylic monomer having a carboxyl group and the acrylic monomer having a hydroxyl group of the first binder particles, but is not limited thereto. When the thermal curing agent is included within the above range, battery performance degradation by the residual curing agent may be prevented, and the strength of the coating layer is improved to prevent the rapid migration and overload of lithium ions, even in the case that the porous substrate is damaged, which is thus preferred.

According to an exemplary embodiment of the present invention, the thermal curing agent may be in the form of an emulsion or an aqueous type of oligomer having any one or two or more functional groups selected from an epoxy group and an oxazoline group. The form may be selected depending on an increase of air permeability or thermal resistance, and provided, however, preferably may be an aqueous type of oligomer, but is not limited thereto.

In addition, according to an exemplary embodiment of the present invention, the oligomer thermal curing agent may nave a weight average molecular weight of 10,000 to 200,000 g/mol, but is not limited thereto. When the thermal curing agent has the weight average molecular weight as such, viscosity adjustment for uniform coating when forming the coating layer is easy, and the melt fracture temperature, and the like are improved to increase thermal stability.

According to an exemplary embodiment of the present invention, the thickness of the coating layer is not limited, as long as the object of the present invention is achieved, however, for example, the coating layer may be formed on the porous substrate at a thickness of 1 to 20 µm, and preferably 1 to 15 µm, but is not limited thereto. When the coating layer is formed at the above thickness, securing thermal stability is possible, and ion permeability is relatively excellent to improve a battery capacity, which is thus preferred.

According to an exemplary embodiment of the present invention, the composite separator for a secondary battery may have thermal shrinkage at 160° C. of 3% or less, and a melt fracture temperature of 400° C. or more. Preferably, the composite separator may have thermal shrinkage at 160° C. of 1.5% or less, and a melt fracture temperature of 405° C. or more. Specifically, the composite separator may have thermal shrinkage of 0.1 to 3%, and a melt fracture temperature of 400 to 600° C. Preferably, the composite separator may have thermal shrinkage of 0.1 to 1.5%, and a melt fracture temperature of 405 to 600° C. The composite separator for a secondary battery manufactured by the present invention has the physical properties as described above, and thus, has significantly low shrinkage at a high temperature to have significantly improved thermal stability and effect of improving a lifespan.

According to an exemplary embodiment of the present invention, the porous substrate may be used without limitation, as long as the substrate is a microporous film adopted in the present technical field, such as a polyolefin-based resin, and furthermore, the porous substrate is not limited, as long as the substrate has pores and may be applied to a battery, such as a nonwoven fabric, paper, and those including inorganic particles in the internal pores or on the surface of the microporous film thereof.

It is preferred that the polyolefin-based resin is a polyolefin-based resin alone or a mixture, and specifically for example, the polyolefin-based resin may be any one or a mixture of two or more selected from the group consisting of polyethylene, polypropylene and a copolymer thereof. In addition, the porous substrate may be prepared by using the polyolefin resin alone or using the polyolefin resin as a main component and further including inorganic particles or organic particles. The porous substrate may be used in a laminated form, and for example, the polyolefin-based resin may be formed in multiple layers, and for the substrate layer composed of multiple layers also, the case that any one layer or all layers includes inorganic particles and organic particles in the polyolefin resin is not excluded.

According to an exemplary embodiment of the present invention, the thickness of the porous substrate is not particularly limited, however, may be preferably 5 to 30 µm. As the porous substrate, a porous substrate mainly made of stretching may be adopted, but is not limited thereto.

The composite separator for a secondary battery as described above according to an exemplary embodiment of the present invention is provided by a method for manufacturing a composite separator for a secondary battery, including: a) coating aqueous slurry including inorganic particles, first binder particles, a second binder, a thermal curing agent and water on a porous substrate; and b) after the coating, performing thermal curing to form a coating layer, wherein the first binder particles contain a copolymer of a monomer mixture including an acrylamide-based monomer, a vinyl cyanide-based monomer, an acrylic monomer having a carboxyl group and an acrylic monomer having a hydroxyl group.

By the manufacturing method, the separator for a lithium secondary battery having very improved thermal stability and very improved capacity properties such as a discharge capacity of a battery may be manufactured. This may be supported by the Examples as described below.

Hereinafter, the present invention will be described in more detail.

A step of coating aqueous slurry including inorganic particles, first binder particles, a second binder, a thermal curing agent and water on the porous substrate according to an exemplary embodiment of the present invention is a step of coating aqueous slurry for forming a coating layer having excellent thermal stability and electrical properties. The types of porous substrate, inorganic particles, first binder particles, second binder, and thermal curing agent are as described above, and thus, description thereof will be omitted.

According to an exemplary embodiment of the present invention, the aqueous slurry may include the inorganic particles, the first binder particles, the second binder, and the thermal curing agent, and be in the form of being dispersed in water. Specifically, the first binder particles may be provided in the form of particles dispersed in water by emulsion or suspension polymerization. Into the water in which the first binder particles are dispersed, the inorganic particles, the second binder, and the thermal curing agent are added and dispersed therein to prepare the aqueous slurry.

The first binder particles contain a copolymer of a monomer mixture including an acrylamide-based monomer, a vinyl cyanide-based monomer, an acrylic monomer having a carboxyl group and an acrylic monomer having a hydroxyl group by emulsion polymerization or suspension polymerization to form a coating layer, whereby surprisingly, the composite separator has significantly low thermal shrinkage at 160° C. to have significantly superior thermal stability and effect of improving a lifespan. In addition, the composite separator may prevent limitation of lithium ion migration due to pore closure, and stably maintain pores when pressure is applied, and thus, is preferred.

According to an exemplary embodiment of the present invention, the first binder particles may contain 30 to 50 wt % of the acrylamide-based monomer, 20 to 40 wt % of the vinyl cyanide-based monomer, 5 to 20 wt % of the acrylic monomer having a carboxyl group, and 5 to 20 wt % of the acrylic monomer having a hydroxyl group, based on the total amount of the first binder particles. Preferably, the first binder particles may contain 40 to 50 wt % of the acrylamide-based monomer, 30 to 40 wt % of the vinyl cyanide-based monomer, 5 to 15 wt % of the acrylic monomer having a carboxyl group, and 5 to 15 wt % of the acrylic monomer having a hydroxyl group. As the coating layer is formed by including the copolymer of the monomer mixture in the above range, the composite separator has significantly low thermal shrinkage at 160° C., thereby having significantly superior thermal stability and effect of improving a lifespan.

According to an exemplary embodiment of the present invention, the inorganic particles and the first binder particles may have an average particle diameter of 10 nm to 2 µm, and preferably 50 to 800 nm. The average particle diameters of the inorganic particles and the first binder particles may be identical to or different from each other, however, it is preferred that the average particle diameters are different for thermal stability and electrical properties of the separator.

According to an exemplary embodiment of the present invention, it is preferred that the average particle diameter is different for thermal stability and electrical properties of the composite separator, and specifically for example, the inorganic particles and the first binder particles may have an average particle diameter ratio satisfying the following Formula 1:

$$0.1 \leq \frac{R_a}{R_i} \leq 0.6 \quad \text{[Formula 1]}$$

wherein $R_a$ is an average particle diameter of the first binder particles; and $R_i$ is an average particle diameter of the inorganic particles.

When the inorganic particles and the first binder particles are included at the average particle diameter ratio, the thermal stability of the composite separator may be further improved. In addition, the inorganic particles may secure pores generated between inorganic particles, or between inorganic particles and the porous substrate by partial adhesion or bonding by the first binder particles, which is thus preferred.

According to an exemplary embodiment of the present invention, the water may include one or a mixture of two or more selected from the group consisting of distilled water, purified water, and the like.

According to an exemplary embodiment of the present invention, as a method of coating the aqueous slurry of the above manufacturing method on the porous substrate, a common method adopted in this field may be employed, and the method is not particularly limited, and specifically for example, a bar coating method, a rod coating method, a die coating method, a wire coating method, a comma coating method, a micro gravure/gravure method, a dip coating method, a spray method, an ink-jet coating method, or a combination method and a modified method thereof, may be used, and after coating and drying steps therethrough, the coating layer having a thickness of 1 to 20 μm, and preferably 1 to 15 μm may be formed on the porous substrate. However, the thickness of the coating layer is not limited thereto.

According to an exemplary embodiment of the present invention, a thermal curing temperature in step b) may be 80 to 120° C. The thermal curing may be performed after drying, or performed alone. When the thermal curing is performed within the above range, the coating layer is uniformly cured while the physical properties of the porous substrate are not influenced, thereby preventing poor coating, which is thus preferred. The step of thermal curing is a step of inducing water drying in the aqueous slurry formed on the porous substrate and a curing reaction of the thermal curing agent, thereby finally forming the coating layer.

According to an exemplary embodiment of the present invention, a lithium secondary battery including the composite separator for a secondary battery as described above is provided. The lithium secondary battery may be manufactured by including the composite separator for a secondary battery according to an exemplary embodiment of the present invention, a positive electrode, a negative electrode, and a nonaqueous electrolyte.

The composite separator for a secondary battery is as described above, and thus, the description thereof will be omitted.

According to an exemplary embodiment of the present invention, the positive electrode and the negative electrode may be prepared by mixing and stirring a positive electrode active material and a negative electrode active material with a solvent, and if necessary, a binder, a conductive material, a dispersing material, and the like to prepare a mixture, which is coated on a current collector of a metal material and dried, and then pressed.

Any positive electrode active material is usable, as long as it is an active material commonly used in the positive electrode of a secondary battery. For example, lithium metal oxide particles including one or two or more metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof may be used.

Any negative electrode active material is usable, as long as it is an active material commonly used in the negative electrode of a secondary battery. It is preferred that the negative electrode active material of the lithium secondary battery is capable of lithium intercalation. As a non-limiting exemplary embodiment, the negative electrode active material may be one or two or more materials selected from the group of negative electrode active materials of lithium (metal lithium), graphitizable carbon, non-graphitizable carbon, graphite, silicon, an Sn alloy, an Si alloy, an Sn oxide, an Si oxide, a Ti oxide, an Ni oxide, a Fe oxide (FeO), and a lithium-titanium oxide ($LiTiO_2$, $Li_4Ti_5O_{12}$).

As the conductive materials, a common conductive carbon material may be used without limitation.

The current collector of the metal material is a metal which has high conductivity and to which the mixture of the positive electrode active material or the negative electrode active material may be easily adhered, and any one may be used as long as it has no reactivity in the range of battery voltage. A non-limiting example of the positive electrode current collector may include foil prepared by aluminum, nickel or a combination thereof, and the like, and a non-limiting example of the negative electrode current collector may include foil prepared by copper, gold, nickel, a copper alloy or a combination thereof, and the like.

Between the positive electrode and the negative electrode, the separator is interposed, and as a method of applying the separator to a battery, in addition to winding as a common method, lamination (stack) of the separator and the electrode, folding, and the like may be used.

The nonaqueous electrolyte solution includes a lithium salt as an electrolyte and an organic solvent, and as the lithium salt, those commonly used in the electrolyte solution for a lithium secondary battery may be used without limitation, and represented by $Li^+X^{31}$.

The anion of the lithium salt is not particularly limited, and any one or two or more selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used.

As the organic solvent, any one or a mixture of two or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimetoxyethane, diethoxyethane, sulfolane, γ-butyrolactone, tetrahydrofuran, and the like may be used.

The nonaqueous electrolyte solution may be injected to an electrode structure composed of the positive electrode, the negative electrode, and a separator interposed between the positive electrode and the negative electrode.

The external shape of the lithium secondary battery is not particularly limited, however, may be selected from the group consisting of a cylindrical shape using a can, a square shape, a pouch shape, a coin shape, and the like.

As described above, though the exemplary embodiments of the present invention have been described in detail, a person skilled in the art may make various variations of the present invention without departing from the spirit and the scope of the present invention, as defined in the claims which follow. Accordingly, any modification of the following Examples of the present invention may not depart from the technique of the present invention.

[Measurement Method of Physical Properties]

Measurement of Thermal Shrinkage

In the method of measuring the thermal shrinkage at 160° C. of the separator, a separator was cut into a square shape with each side of 10 cm to prepare a sample, and the sample before experiment was measured using a camera and the result was recorded. Five sheets of A4 paper were placed on the upper and lower portions of the sample, respectively so that the sample was positioned at the center, and the four sides of the paper were clipped. The sample wrapped in paper was allowed to stand in a hot-air drying oven at 160° C. for 1 hour. After standing, the sample was taken out of the oven, and measured with a camera, and shrinkage in a machine direction (MD) of the following Equation 1, and shrinkage in a transverse direction (TD) of the following Equation 2 were calculated.

$$\text{Shrinkage in MD (\%)} = (\text{length in MD before heating} - \text{length in MD after heating}) \times 100 / \text{length in MD before heating} \quad [\text{Equation 1}]$$

$$\text{Shrinkage in TD (\%)} = (\text{length in TD before heating} - \text{length in TD after heating}) \times 100 / \text{length in TD before heating} \quad [\text{Equation 2}]$$

TMA Maximum Shrinkage and Melt Fracture Temperature

Thermo-mechanical analysis (TMA) equipment available from METTLER TOLEDO was used to attach a weight of 0.015 N to a separator specimen of 6 mm×10 mm, and heating was performed at a rate of 5° C./min. A specimen manufactured by a stretching process shrinks at a certain temperature, and is stretched by the weight of the weight at a temperature above $T_g$ and $T_m$.

The TMA maximum shrinkage is defined as a shrinkage deformation length relative to an initially measured length at a maximum shrinkage point generated at a certain temperature, which is a value expressed in %, and starts to increase by the weight of the weight, wherein the temperature at which the length of the specimen starts to be larger than the initial length (zero point) of the specimen is defined as a melt fracture temperature. In addition, in the case the sample which does not shrink, the melt fracture temperature is defined as a temperature meeting the x-axis, based on the case that the slope is at the maximum.

Measurement of Tensile Strength

A method of measuring the tensile strength of the separator is in accordance with the standard of ASTM D882. The tensile strength of the separator was measured in a machine direction (MD) and in a transverse direction (TD), respectively, and then a smaller value of those in MD and TD is defined as the tensile strength of the separator. Each sample was prepared by cutting the separator into a rectangular shape of a width of 15 mm×a height of 120 mm, and stretched at a rate of 500 mm/min by a stretcher, and a value of strength (kgf) when the separator sample was broken divided by a width (15 mm) of the sample was recorded and compared.

Measurement of Discharge Capacity

For the manufactured lithium secondary battery, a discharge capacity was measured at a discharge current of 0.2 C to 3.0 C.

Measurement of Battery Life

Each battery manufactured by the above assembly process was charged and discharged 500 times at a discharge rate of 1 C, and then the discharge capacity was measured. Cycle evaluation was performed by measuring a discharge capacity to measure a decreased degree of capacity relative to the initial capacity.

Measurement of Battery Thickness

In order to confirm whether there is a lifting phenomenon between an electrode plate and the separator, and whether the battery is deformed, during charge and discharge of the battery, after charge and discharge 500 times, a thickness of the battery was measured using Thickness Gauge available from Mitsutoyo, and then compared with the thickness before charge and discharge. Then, a thickness increase rate of the following Equation 3 was measured:

$$\text{Battery thickness increase rate (\%)} = (B-A)/A \times 100 \quad [\text{Equation 3}]$$

wherein A: a battery thickness (mm) before charge and discharge,

B: a battery thickness (mm) after charge and discharge.

Battery Penetration Evaluation

In order to measure the safety of the battery, each manufactured battery was fully charged to the state of charge (SOC) of 100%, and nail penetration evaluation was performed. Here, the diameter of the nail was 3.0 mm, and the penetration speed of the nail was all set to 80 mm/min. L1: no change, L2: slightly heated, L3: leakage, L4: fuming, L5: Ignition, in which L1 to L3 were judged as passing, and L4 and L5 were judged as fail.

Examples 1 to 16, and Comparative Examples 1 to 10

Manufacture of Separator

Example 1

A reactor of a four neck flask equipped with a stirrer, a thermometer, a nitrogen inlet, and a circulating condenser was prepared. To the reactor, 0.002 parts by weight of ferrous sulfate, and 0.04 parts by weight of disodium ethylenediaminetetraacetate, based on 100 parts by weight of deionized water (DI water) were added, and the internal temperature of the reactor was maintained at 35° C. under the nitrogen atmosphere.

70 parts by weight of deionized water, 0.06 parts by weight of n-dodecyl mercaptan as an emulsifier, and 35 parts by weight of acrylamide, 21 parts by weight of acrylonitrile, 7 parts by weight of acrylic acid and 7 parts by weight of 2-hydroxyethylacrylate as a monomer mixture were mixed to prepare a monomer solution.

When the internal temperature of the reactor reached 35° C., the monomer solution, and 0.001 parts by weight of benzoyl peroxide as a polymerization initiator, and 0.020 parts by weight of sodium formaldehyde sulfoxylate (SFS) were added dropwise for 3 hours to allow the reaction to proceed. Thereafter, 0.0001 parts by weight of benzoyl peroxide and 0.002 parts by weight of sodium formaldehyde sulfoxylate (SFS) were further added to remove residual monomers, and the reaction was performed for 2 hours to prepare the first binder particles. The thus-prepared first binder particles were in the form of latex, and had an average particle diameter of 115 nm, and a glass transition temperature of 181° C.

To 100 parts by weight of water, 10 parts by weight of the first binder particles were added, and dispersed therein, and 90 parts by weight of boehmite (γ-AlO(OH)) having an average particle diameter of 500 nm (available from Nabaltec, Apyral AOH60), 0.5 parts by weight of polyvinyl alcohol (PVA217, KURARAY POVAL), and 2 parts by weight of ethylene glycol diglycidyl ether were added thereto and stirred, thereby preparing uniform aqueous slurry.

As the porous substrate, a polyolefin microporous product having a thickness of 9 μm (ENPASS, available from SK Innovation) was used, and a slot coating die was used to coat the aqueous slurry on both surfaces of the substrate at a rate of 10 m/min.

Thereafter, the substrate was passed through a dryer emitting hot air at 60° C. having a length of 6 m at a rate of 5 m/min, and then wound in a roll shape. After winding, the substrate was thermally cured at 110° C. for 10 minutes, and the thickness of the double-sided coating layer was measured as 11 μm in total.

Example 2

The separator was manufactured in the same manner as in Example 1, except using 28 parts by weight of acrylamide, 28 parts by weight of acrylonitrile, 7 parts by weight of acrylic acid, and 7 parts by weight of 2-hydroxyethylacrylate as the monomer mixture, and the thickness of the double-sided coating layer measured after winding was 10 μm in total.

Example 3

The separator was manufactured in the same manner as in Example 1, except using 21 parts by weight of acrylamide, 28 parts by weight of acrylonitrile, 10.5 parts by weight of acrylic acid, and 10.5 parts by weight of 2-hydroxyethylacrylate as the monomer mixture, and the thickness of the double-sided coating layer measured after winding was 12 μm in total.

Example 4

The separator was manufactured in the same manner as in Example 1, except using 39 parts by weight of acrylamide, 25 parts by weight of acrylonitrile, 3 parts by weight of acrylic acid, and 3 parts by weight of 2-hydroxyethylacrylate as the monomer mixture, and the thickness of the double-sided coating layer measured after winding was 10 μm in total.

Example 5

The separator was manufactured in the same manner as in Example 1, except using 17 parts by weight of acrylamide, 17 parts by weight of acrylonitrile, 18 parts by weight of acrylic acid, and 18 parts by weight of 2-hydroxyethylacrylate as the monomer mixture, and the thickness of the double-sided coating layer measured after winding was 12 μm in total.

Example 6

The separator was manufactured in the same manner as in Example 1, except using 35 parts by weight of acrylamide, 21 parts by weight of acrylonitrile, 10.5 parts by weight of acrylic acid, and 3.5 parts by weight of 2-hydroxyethylacrylate as the monomer mixture, and the thickness of the double-sided coating layer measured after winding was 11 μm in total.

Example 7

The separator was manufactured in the same manner as in Example 1, except using 35 parts by weight of acrylamide, 21 parts by weight of acrylonitrile, 3.5 parts by weight of acrylic acid, and 10.5 parts by weight of 2-hydroxyethylacrylate as the monomer mixture, and the thickness of the double-sided coating layer measured after winding was 11 μm in total.

Example 8

The separator was manufactured in the same manner as in Example 1, except that 2'-methylenebis(2-oxazoline) was used instead of ethylene glycol diglycidyl ether, and the thickness of the double-sided coating layer measured after winding was 10 μm in total.

EXAMPLE 9

The separator was manufactured in the same manner as in Example 1, except that carboxymethylcellulose (CMC) (available from Daicel Chemical Industry, 1220) was used instead of polyvinyl alcohol (PVA217, KURARAY POVAL), and the thickness of the double-sided coating layer measured after winding was 12 μm in total.

Example 10

The separator was manufactured in the same manner as in Example 1, except that 0.25 parts by weight of ethylene glycol diglycidyl ether and 0.25 parts by weight of 2'-methylenebis(2-oxazolne) were used instead of 0.5 parts by weight of ethylene glycol diglycidyl ether, and the thickness of the double-sided coating layer measured after winding was 11 μm in total.

Example 11

The separator was manufactured in the same manner as in Example 1, except that to 100 parts by weight of water, 5 parts by weight of the first binder particles were added, and dispersed therein, and 95 parts by weight of boehmite (γ-AlO(OH)) having an average particle diameter of 500 nm (available from Nabaltec, Apyral AOH60), 0.2 parts by weight of polyvinyl alcohol (PVA217, KURARAY POVAL), and 1 part by weight of 2'-methylenebis(2-oxazoline) were used, and the thickness of the double-sided coating layer measured after winding was 12 μm in total.

Example 12

The separator was manufactured in the same manner as in Example 1, except using 5 parts by weight of ethylene glycol diglycidyl ether, and the thickness of the double-sided coating layer measured after winding was 11 μm in total.

Example 13

The separator was manufactured in the same manner as in Example 1, except using 0.1 parts by weight of ethylene glycol diglycidyl ether, and the thickness of the double-sided coating layer measured after winding was 11 μm in total.

Example 14

The separator was manufactured in the same manner as in Example 1, except that to 100 parts by weight of water, 10 parts by weight of the first binder particles were added, and dispersed therein, and 90 parts by weight of boehmite (γ-AlO(OH)) having an average particle diameter of 500 nm (available from Nabaltec, Apyral AOH60), 0.1 parts by weight of polyvinyl alcohol (PVA217, KURARAY POVAL), and 2 parts by weight of ethylene glycol diglycidyl ether were used, and the thickness of the double-sided coating layer measured after winding was 11 μm in total.

Example 15

The separator was manufactured in the same manner as in Example 1, except that to 100 parts by weight of water, 10 parts by weight of the first binder particles were added, and dispersed therein, and 90 parts by weight of boehmite (γ-AlO(OH)) having an average particle diameter of 500 nm (available from Nabaltec, Apyral AOH60), 2.5 parts by weight of polyvinyl alcohol (PVA217, KURARAY POVAL), and 5 parts by weight of ethylene glycol diglycidyl ether were used, and the thickness of the double-sided coating layer measured after winding was 11 μm in total.

Example 16

The separator was manufactured in the same manner as in Example 1, except preparing and using the first binder particle latex having an average particle diameter of 350 nm, and the thickness of the double-sided coating layer measured after winding was 11 μm in total.

Comparative Example 1

The separator was manufactured in the same manner as in Example 1, except using 42 parts by weight of acrylamide, 21 parts by weight of acrylonitrile, and 7 parts by weight of acrylic acid, as the monomer mixture, and the thickness of the double-sided coating layer measured after winding was 10 μm in total.

Comparative Example 2

The separator was manufactured in the same manner as in Example 1, except using 42 parts by weight of acrylamide, 21 parts by weight of acrylonitrile, and 7 parts by weight of 2-hydroxyethylacrylate, as the monomer mixture, and the thickness of the double-sided coating layer measured after winding was 10 μm in total.

Comparative Example 3

The separator was manufactured in the same manner as in Example 1, except using 56 parts by weight of acrylamide, 7 parts by weight of acrylic acid, and 7 parts by weight of 2-hydroxyethylacrylate, as the monomer mixture, and the thickness of the double-sided coating layer measured after winding was 12 μm in total.

Comparative Example 4

The separator was manufactured in the same manner as in Example 1, except using 56 parts by weight of acrylonitrile, 7 parts by weight of acrylic acid, and 7 parts by weight of 2-hydroxyethylacrylate, as the monomer mixture, and the thickness of the double-sided coating layer measured after winding was 11 μm in total.

Comparative Example 5

The separator was manufactured in the same manner as in Example 1, except using 35 parts by weight of acrylamide, and 35 parts by weight of acrylonitrile, as the monomer mixture, and the thickness of the double-sided coating layer measured after winding was 10 μm in total.

Comparative Example 6

The separator was manufactured in the same manner as in Example 1, except that polyvinyl alcohol (PVA217, KURARAY POVAL) was not used, and the thickness of the double-sided coating layer measured after winding was 10 μm in total.

Comparative Example 7

The separator was manufactured in the same manner as in Example 1, except that ethylene glycol diglycidyl ether was not used, and the thickness of the double-sided coating layer measured after winding was 11 μm in total.

Comparative Example 8

The separator was manufactured in the same manner as in Example 1, except that polyvinyl alcohol (PVA217, KURARAY POVAL) and ethylene glycol diglycidyl ether were not used, and the thickness of the double-sided coating layer measured after winding was 10 μm in total.

Comparative Example 9

10 parts by weight based on a solid content of a polyvinylidene fluoride binder dissolved in dimethyl sulfoxide (DMSO) at 30 wt %, and 90 parts by weight of boenmite (γ-AlO(0H)) having an average particle diameter of 500 nm. (available from Nabaltec, Apyral AOH60) were mixed, and stirred, thereby preparing uniform slurry.

As the porous substrate, a polyolefin microporous product having a thickness of 9 μm (ENPASS, available from SK Innovation) was used, and a slot coating die was used to coat the slurry on both surfaces of the substrate at a rate of 10 m/min. The thickness of the double-sided coating layer measured after winding was 10 μm in total.

Comparative Example 10

10 parts by weight of acrylic latex having Tg of −52° C. (product name: BM900B, solid content: 20 wt %) and 90 parts by weight of boehmite (γ-AlO(OH)) having an average particle diameter of 500 nm (available from Nabaltec, Apyral AOH60) were mixed, and stirred, thereby preparing uniform slurry.

As the porous substrate, a polyolefin microporous product having a thickness of 9 μm (ENPASS, available from SK Innovation) was used, and a slot coating die was used to coat the slurry on both surfaces of the substrate at a rate of 10 m/min. The thickness of the double-sided coating layer measured after winding was 10 μm in total.

Examples 17 to 32, and Comparative Examples 11 to 20

Manufacture of Lithium Secondary Battery

Examples 17 to 32, and Comparative Examples 11 to 20

(1) Manufacture of Positive Electrode 94 wt % of $LiCoO_2$ as the positive active material, 2.5 wt % of polyvinylidene fluoride as the adhesive, and 3.5 wt % of carbon black as a conductive agent were added to N-methyl-2-pyrrolidone (NMP) as the solvent, and stirred to prepare uniform positive electrode slurry. The slurry was coated on aluminum foil having a thickness of 30 μm, dried at a temperature of 120° C., and pressed, thereby preparing a positive electrode plate having a thickness of 150 μm.

(2) Manufacture of Negative Electrode 95 wt % of artificial graphite as the negative active material, 3 wt % of acrylic latex having Tg of −52° C. (product name: BM900B, solid content: 20 wt %), and 2 wt % of carboxumethyl cellulose (CMC) as a thickener were added to water as the solvent, and stirred, thereby preparing uniform negative electrode slurry. The slurry was coated on copper foil having a thickness of 20 μm, dried at a temperature of 120° C., and pressed, thereby preparing a negative electrode plate having a thickness of 150 μm.

(3) Manufacture of Battery

The positive electrode and the negative electrode as manufactured above, and the separators manufactured in Examples 17 to 32, and Comparative Examples 11 to 20 were used to assembly a pouch type battery in a stacking manner, and to each assembled battery, an electrolyte solution of 1M lithium hexafluorophosphate ($LiPF_6$) dissolved in ethylene carbonate (EC)/ethylmethyl carbonate (EMC)/dimethyl carbonate (DMC)=3:5:2 (volume ratio) was injected to manufacture a lithium secondary battery.

The evaluation results of the properties of the separators of Examples 1 to 16, and Comparative Examples 1 to 10 are shown in Table 1, the evaluation results of the lithium secondary batteries of Examples 17 to 32, and Comparative Examples 11 to 20 are shown in Table 2, and the measurement results of the discharge capacity of the lithium secondary battery of Examples 17 to 32, and Comparative Examples 11 to 20 are shown in Table 3. The unit of the discharge capacity in Table 3 is mAh/g, which represents a capacity relative to the mass of the positive electrode active material.

The unit of the discharge capacity in Table 3 is mAh/g, which represents a capacity relative to the mass of the positive electrode active material.

TABLE 1

| Item | Thermal shrinkage at 160° C. (MD/TD, %) | TMA maximum shrinkage (%) | TMA melt fracture temperature (° C.) | Glass transition temperature (° C.) | Tensile strength (Kgf) | Average particle diameter ratio |
| --- | --- | --- | --- | --- | --- | --- |
| Example 1 | 0.6/0.7 | 1.2 | 470 | 182 | 1.5 | 0.27 |
| Example 2 | 0.6/0.6 | 1.3 | 475 | 185 | 1.4 | 0.33 |
| Example 3 | 0.7/0.7 | 1.3 | 466 | 183 | 1.5 | 0.26 |
| Example 4 | 1.0/1.2 | 1.8 | 440 | 165 | 1.3 | 0.35 |
| Example 5 | 0.6/0.6 | 1.1 | 475 | 186 | 0.5 | 0.29 |
| Example 6 | 0.8/0.8 | 1.4 | 460 | 180 | 1.4 | 0.41 |
| Example 7 | 0.6/0.6 | 1.2 | 473 | 183 | 1.6 | 0.33 |
| Example 8 | 1.2/1.6 | 2.0 | 390 | 174 | 1.3 | 0.34 |
| Example 9 | 0.9/1.0 | 1.9 | 408 | 178 | 1.4 | 0.29 |
| Example 10 | 0.8/1.0 | 1.9 | 413 | 178 | 1.3 | 0.33 |
| Example 11 | 0.7/0.7 | 1.4 | 470 | 180 | 0.9 | 0.24 |
| Example 12 | 0.6/0.6 | 1.2 | 475 | 185 | 1.9 | 0.31 |
| Example 13 | 0.9/0.9 | 1.8 | 458 | 177 | 0.6 | 0.30 |
| Example 14 | 2.6/3.1 | 3.9 | 360 | 170 | 1.1 | 0.44 |
| Example 15 | 0.7/0.7 | 1.4 | 471 | 181 | 0.8 | 0.24 |
| Example 16 | 1.0/1.2 | 2.2 | 370 | 181 | 1.2 | 0.70 |
| Comparative Example 1 | 10.3/10.5 | 12.0 | 162 | 15 | 1.0 | 0.41 |
| Comparative Example 2 | 8.6/9.1 | 10.1 | 174 | 30 | 1.0 | 0.33 |
| Comparative Example 3 | 7.5/6.9 | 8.0 | 180 | 155 | 0.5 | 0.45 |
| Comparative Example 4 | 7.4/7.1 | 8.0 | 181 | 156 | 0.9 | 0.36 |
| Comparative Example 5 | 11.2/10.9 | 13.2 | 160 | −16 | 1.5 | 0.45 |
| Comparative Example 6 | 5.5/5.7 | 6.5 | 200 | 80 | 1.0 | 0.31 |
| Comparative Example 7 | 3.6/3.4 | 3.7 | 388 | 160 | 0.8 | 0.28 |
| Comparative Example 8 | 8.6/8.7 | 9.6 | 172 | 34 | 0.6 | 0.55 |
| Comparative Example 9 | 13.7/13.9 | 14.8 | 179 | −35 | 1.1 | — |
| Comparative Example 10 | 15.5/15.6 | 16.4 | 184 | −52 | 1.0 | — |

As shown in the above Table 1, the composite separators of the Examples in which the coating layer was formed on both surfaces of the porous substrate by including the inorganic particles, the first binder particles, the second binder, and the thermal curing agent had low thermal shrinkage at 160° C. and TMA maximum shrinkage, and a significantly increased TMA melt fracture temperature, as compared with those of the Comparative Examples, whereby it is confirmed that the thermal stability of the composite separators were significantly improved.

In addition, in the case that the first binder particles and the inorganic particles have the average particle diameter ratio satisfying the above Equation 1, it was found that when comparing Example 1 and Example 16, the thermal properties were further increased, whereby it was confirmed that more improved thermal stability was able to be implemented.

In addition, comparing Examples 8 and 9 with Example 1, it was confirmed that when using the compound having an epoxy group as the thermal curing agent, the thermal resistance and strength were better, and when using the vinyl alcohol-based compound rather than the cellulose-based compound as the second binder, a significant rise of the melt fracture temperature was able to be implemented.

In addition, in the case that the first binder particles of the present invention is prepared from the ranges of 30 to 50 wt % of the acrylamide-based monomer, 20 to 40 wt % of the vinyl cyanide-based monomer, 5 to 20 wt % of the acrylic monomer having a carboxyl group, and 5 to 20 wt % of the acrylic monomer having a hydroxyl group, it was confirmed that further improved thermal stability and separator strength may be represented.

However, the composite separators of the Comparative Examples in which the coating layer not including any one of the inorganic particles, the first binder particles, the second binder, and the thermal curing agent was formed were confirmed to have higher thermal shrinkage at 160° C. and TMA maximum shrinkage, and a lower TMA melt fracture temperature than those of the Examples.

In addition, in the case that polyvinylidene fluoride of Comparative Example 9, and the acrylic polymer having a significantly low glass transition temperature of Comparative Example 10 were used as the coating layer, it was confirmed that the thermal shrinkage at 160° C. and the TMA maximum shrinkage were higher than those of the Examples, and the TMA melt fracture temperature was low. Besides, it was confirmed that when shut down or melt down of the porous substrate occurred at a high temperature due to low thermal stability, it was difficult to prevent an inter-electrode short circuit, thereby decreasing battery stability.

TABLE 2

| Item | Battery life discharge capacity reduction rate (%) | Battery thickness change (%) | Battery penetration stability |
| --- | --- | --- | --- |
| Example 17 | 87.3 | 1.1 | L3 (pass) |
| Example 18 | 88.3 | 1.1 | L3 (pass) |
| Example 19 | 87.1 | 1.1 | L3 (pass) |
| Example 20 | 82.0 | 1.2 | L3 (pass) |
| Example 21 | 79.6 | 1.5 | L5 (fail) |
| Example 22 | 85.3 | 1.1 | L3 (pass) |
| Example 23 | 88.1 | 1.1 | L3 (pass) |
| Example 24 | 83.9 | 1.2 | L3 (pass) |
| Example 25 | 84.5 | 1.1 | L3 (pass) |
| Example 26 | 85.6 | 1.1 | L3 (pass) |
| Example 27 | 87.6 | 1.1 | L3 (pass) |
| Example 28 | 86.6 | 1.1 | L3 (pass) |
| Example 29 | 87.0 | 1.1 | L3 (pass) |
| Example 30 | 86.1 | 1.1 | L3 (pass) |
| Example 31 | 88.1 | 1.1 | L3 (pass) |
| Example 32 | 79.7 | 1.2 | L5 (fail) |
| Comparative Example 11 | 67.8 | 4.1 | L3 (pass) |
| Comparative Example 12 | 68.1 | 2.2 | L3 (pass) |
| Comparative Example 13 | 71.1 | 2.5 | L5 (fail) |
| Comparative Example 14 | 70.9 | 2.6 | L5 (fail) |
| Comparative Example 15 | 63.6 | 4.4 | L5 (fail) |
| Comparative Example 16 | 60.4 | 5.9 | L5 (fail) |
| Comparative Example 17 | 62.4 | 8.8 | L5 (fail) |
| Comparative Example 18 | 60.3 | 9.8 | L5 (fail) |
| Comparative Example 19 | 58.3 | 6.1 | L5 (fail) |
| Comparative Example 20 | 59.1 | 6.2 | L3 (pass) |

As shown in the above Table 2, it was confirmed that the lithium secondary battery including the composite separator of the Examples which includes the inorganic particles, the first binder particles, the second binder, and the thermal curing agent on both surfaces of the porous substrate to form the coating layer, had an excellent discharge capacity, and due to significantly improved thermal stability, an inter-electrode short circuit was prevented, despite the battery penetration, whereby battery stability such as a discharge capacity reduction rate, a battery thickness change, and battery penetration stability was significantly increased.

In the case that the first binder particles and the inorganic particles have the average particle diameter ratio satisfying the above Equation 1, it was found that excellent thermal resistance, the discharge capacity reduction rate, the battery thickness change, and the battery penetration stability were further increased, when comparing Example 17 and Example 32, whereby it was confirmed that more improved battery stability was able to be implemented.

In addition, comparing Examples 24 and 25 with Example 17, it was confirmed that when using the compound having an epoxy group as the thermal curing agent, the thermal resistance and strength were better, thereby having excellent effect of improving a lifespan and battery stability, and when using the vinyl alcohol-based compound rather than the cellulose-based compound as the second binder, a significant rise of the melt fracture temperature exhibited, thereby having excellent effect of improving a lifespan and battery stability.

In addition, in the case that the first binder particles of the present invention is prepared from the ranges of 30 to 50 wt % of the acrylamide-based monomer, 20 to 40 wt % of the vinyl cyanide-based monomer, 5 to 20 wt % of the acrylic monomer having a carboxyl group, and 5 to 20 wt % of the acrylic monomer having a hydroxyl group, it was confirmed that excellent thermal stability and separator strength were presented, thereby showing a further improved effect of improving a battery lifespan.

However, the lithium secondary battery including the composite separator of the Comparative Example in which the coating layer not including any one of the inorganic particles, the first binder particles, the second binder and the thermal curing agent was formed, was confirmed not to implement an effect of improving a lifespan following repetitive battery use due to low thermal stability, and to represent low battery stability.

In addition, in the case that polyvinylidene fluoride of Comparative Example 19, and the acrylic polymer having a significantly low glass transition temperature of Comparative Example 20 were used as the coating layer, it was confirmed that when shut down or melt down of the porous substrate occurred at a high temperature by low thermal stability, it was difficult to prevent an inter-electrode short circuit to decrease battery stability.

TABLE 3

| | Discharge current | | | | | |
|---|---|---|---|---|---|---|
| | 0.2 C | 0.5 C | 1.0 C | 1.5 C | 2.0 C | 3.0 C |
| Example 17 | 180 | 177 | 174 | 160 | 149 | 110 |
| Example 18 | 181 | 177 | 176 | 162 | 148 | 111 |
| Example 19 | 180 | 176 | 173 | 157 | 146 | 118 |
| Example 20 | 177 | 173 | 169 | 151 | 138 | 109 |
| Example 21 | 181 | 175 | 170 | 156 | 135 | 96 |
| Example 22 | 179 | 177 | 175 | 161 | 148 | 110 |
| Example 23 | 181 | 178 | 175 | 161 | 149 | 111 |
| Example 24 | 175 | 171 | 169 | 156 | 143 | 108 |
| Example 25 | 178 | 175 | 172 | 159 | 147 | 109 |
| Example 26 | 179 | 176 | 175 | 161 | 149 | 110 |
| Example 27 | 181 | 178 | 175 | 163 | 150 | 111 |
| Example 28 | 181 | 178 | 174 | 162 | 148 | 111 |
| Example 29 | 178 | 175 | 172 | 156 | 143 | 110 |
| Example 30 | 171 | 167 | 162 | 151 | 139 | 101 |
| Example 31 | 179 | 176 | 171 | 161 | 147 | 109 |
| Example 32 | 164 | 160 | 155 | 144 | 128 | 89 |
| Comparative Example 11 | 130 | 128 | 121 | 112 | 87 | 49 |
| Comparative Example 12 | 140 | 137 | 133 | 119 | 95 | 54 |
| Comparative Example 13 | 141 | 137 | 134 | 118 | 96 | 55 |
| Comparative Example 14 | 139 | 136 | 131 | 116 | 94 | 52 |
| Comparative Example 15 | 121 | 118 | 114 | 101 | 84 | 49 |
| Comparative Example 16 | 144 | 140 | 132 | 115 | 92 | 55 |
| Comparative Example 17 | 160 | 155 | 150 | 133 | 120 | 81 |
| Comparative Example 18 | 136 | 133 | 127 | 112 | 88 | 44 |
| Comparative Example 19 | 117 | 114 | 110 | 94 | 79 | 40 |
| Comparative Example 20 | 114 | 110 | 108 | 90 | 71 | 39 |

As shown in the above Table 3, the lithium secondary battery including the composite separator of the Examples in which the coating layer was formed by including the inorganic particles, the first binder particles, the second binder, and the thermal curing agent on both surfaces of the porous substrate was confirmed to have a significantly improved discharge capacity.

In the case that the first binder particles and the inorganic particles had the average particle diameter ratio satisfying the above Equation 1, it was confirmed that the discharge capacity was further improved, when comparing Example 17 and Example 32.

In addition, comparing Examples 24 and 25 with Example 17, it was confirmed that when using the compound having an epoxy group as the thermal curing agent, the thermal resistance and strength were better to have an excellent discharge capacity improvement effect, and when using the vinyl alcohol-based compound rather than the cellulose-based compound as the second binder, a significant rise of the melt fracture temperature was expressed to have an excellent discharge capacity improvement effect.

In addition, in the case that the first binder particles of the present invention were prepared from the ranges of 30 to 50 wt % of the acrylamide-based monomer, 20 to 40 wt % of the vinyl cyanide-based monomer, 5 to 20 wt % of the acrylic monomer having a carboxyl group, and 5 to 20 wt % of the acrylic monomer having a hydroxyl group, it was confirmed that excellent thermal stability and separator strength were exhibited, thereby showing a further improved discharge capacity improvement effect.

However, the lithium secondary battery including the composite separator of the Comparative Example in which the coating layer not including any one of the inorganic particles, the first binder particles, the second binder and the thermal curing agent was formed, was confirmed to have a poor discharge capacity.

In addition, in the case that polyvinylidene fluoride of Comparative Example 19, and the acrylic polymer having a significantly low glass transition temperature of Comparative Example 20 which were conventionally used, were used as the coating layer, it was confirmed that the discharge capacity of the battery was shown to have rapidly deteriorated properties as compared with the Examples.

Accordingly, the composite separator for a secondary battery of the present invention has excellent thermal stability and battery stability, and also has excellent electrical properties such as a discharge capacity. Thus, when the separator is applied to a lithium secondary battery, significantly excellent properties may be exhibited.

The composite separator for a secondary battery according to an exemplary embodiment of the present invention has significantly improved thermal stability such as low thermal shrinkage and high melt fracture temperature, and thus, may prevent ignition or rupture due to an abnormal phenomenon such as rapidly raised temperature.

In addition, the composite separator for a secondary battery according to an exemplary embodiment of the present invention leads to a significant rise of melt fracture temperature, and thus, may further improve the thermal stability.

In addition, the composite separator for a secondary battery according to an exemplary embodiment of the present invention may prevent pore closure of a porous substrate, and allows easy migration of lithium ions, and thus, may have significantly improved electrical properties such as a discharge capacity of a secondary battery.

In addition, since the composite separator for a secondary battery according to an exemplary embodiment of the present invention has a coating layer formed thereon, in which firm and dense bonding between particles is derived, the rapid migration and overload of lithium ions may be prevented, even in the case that the porous substrate is damaged.

In addition, the composite separator for a secondary battery according to an exemplary embodiment of the present invention may be introduced for improving thermal stability and electrical properties of a large lithium secondary battery applied to an electric vehicle, and the like.

Hereinabove, although the composite separator for a secondary battery and the lithium secondary battery including the same have been described in the present invention by specific matters and limited exemplary embodiments, the exemplary embodiments have been provided only for assisting in the entire understanding of the present invention, and the present invention is not limited to the above exemplary embodiments. Various modifications and changes may be made by those skilled in the art to which the present invention pertains from this description. Therefore, the spirit of the present invention should not be limited to the above-described exemplary embodiments, and the following claims as well as all modified equally or equivalently to the claims are intended to fall within the scope and spirit of the invention.

What is claimed is:

1. A composite separator for a secondary battery comprising:
    a porous substrate; and
    a coating layer formed on the porous substrate, by thermally curing an aqueous slurry including inorganic particles, first binder particles, a second binder, and a thermal curing agent,
    wherein the first binder particles contain a copolymer of a monomer mixture including 30 to 50 wt % of acrylamide-based monomer, 20 to 40 wt % of a vinyl cyanide-based monomer, 5 to 20 wt % of an acrylic monomer having a carboxyl group, and 5 to 20 wt % of an acrylic monomer having a hydroxyl group, based on a total amount of the first binder particles,
    wherein the first binder particles have a glass transition temperature of 150 to 200° C.

2. The composite separator for the secondary battery of claim 1, wherein the inorganic particles and the first binder particles have an average particle diameter of 10 nm to 2 μm.

3. The composite separator for the secondary battery of claim 1, wherein the second binder is any one or a mixture of two or more selected from the group consisting of cellulose-based compounds and polyvinyl alcohol-based compounds.

4. The composite separator for the secondary battery of claim 1, wherein the thermal curing agent is any one or a mixture of two or more selected from the group consisting of compounds including any one or two or more functional groups selected from an epoxy group and an oxazoline group.

5. The composite separator for the secondary battery of claim 1, wherein the composite separator for a secondary battery has thermal shrinkage at 160° C. of 3% or less, and a melt fracture temperature of 400° C. or more.

6. A lithium secondary battery comprising the composite separator for the secondary battery of claim 1.

* * * * *

UNITED STATES PATENT AND TRADEMARK OFFICE
CERTIFICATE OF CORRECTION

PATENT NO.         : 10,756,322 B2
APPLICATION NO.    : 16/203258
DATED              : August 25, 2020
INVENTOR(S)        : Yun Bong Kim et al.

It is certified that error appears in the above-identified patent and that said Letters Patent is hereby corrected as shown below:

(71) Applicants should read:
SK INNOVATION CO., LTD., Seoul, (KR)
SK IE TECHNOLOGY CO., LTD., Seoul, (KR)

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*